United States Patent
Kim et al.

(10) Patent No.: US 9,521,682 B2
(45) Date of Patent: *Dec. 13, 2016

(54) METHOD AND APPARATUS FOR CONTROLLING INTERFERENCE BETWEEN CELLULAR COMMUNICATION AND D2D COMMUNICATION

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Hakseong Kim, Anyang-si (KR); Mochan Yang, Seoul (KR); Erang Lim, Seoul (KR); Shanai Wu, Seoul (KR); Ohsoon Shin, Seoul (KR); Yoan Shin, Seoul (KR)

(73) Assignees: LG ELECTRONICS INC, Seoul (KR); RESEARCH & BUSINESS FOUNDATION SUNGKYUNKWAN UNIVER, Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/412,655

(22) PCT Filed: Dec. 28, 2012

(86) PCT No.: PCT/KR2012/011817
§ 371 (c)(1),
(2) Date: Jan. 2, 2015

(87) PCT Pub. No.: WO2014/007446
PCT Pub. Date: Jan. 9, 2014

(65) Prior Publication Data
US 2015/0173088 A1    Jun. 18, 2015

Related U.S. Application Data

(60) Provisional application No. 61/666,941, filed on Jul. 2, 2012.

(51) Int. Cl.
*H04W 72/08* (2009.01)
*H04W 76/02* (2009.01)
(Continued)

(52) U.S. Cl.
CPC ........ *H04W 72/082* (2013.01); *H04J 11/0023* (2013.01); *H04W 72/042* (2013.01); *H04W 76/023* (2013.01); *H04W 72/1278* (2013.01)

(58) Field of Classification Search
CPC .. H04W 48/12; H04W 72/082; H04W 72/042; H04W 76/023; H04W 72/1278; H04J 11/0023
(Continued)

(56) References Cited

U.S. PATENT DOCUMENTS 8,914,055 B2 * 12/2014 Dimou ................ H04W 72/082
370/260
2009/0325625 A1 * 12/2009 Hugl .................... H04W 52/16
455/522
(Continued)

FOREIGN PATENT DOCUMENTS

KR  10-2011-0046231  5/2011
KR  10-2012-0050456  5/2012

OTHER PUBLICATIONS

Potevio, "On the application of type II and type I relay," 3GPP TSG-RAN WG1 #57, R1-091968, May 2009, 4 pages.
(Continued)

*Primary Examiner* — Kwang B Yao
*Assistant Examiner* — Syed M Bokhari
(74) *Attorney, Agent, or Firm* — Lee Hong Degerman Kang & Waimey

(57) ABSTRACT

Provided is a method for controlling interference between cellular communication and device-to-device (D2D) communication. An interference control apparatus overhears a
(Continued)

downlink control channel which is transmitted from a cellular base station to a cellular terminal. The control apparatus determines an interference candidate resource, which is subject to inter-cell interference control, on the basis of the downlink control channel. A step of the control apparatus transmitting an interference control message to a D2D terminal using the interference candidate resource is included.

11 Claims, 16 Drawing Sheets

(51) Int. Cl.
  *H04J 11/00* (2006.01)
  *H04W 72/04* (2009.01)
  *H04W 72/12* (2009.01)

(58) Field of Classification Search
  USPC .................. 370/252, 329; 455/450, 522, 517
  See application file for complete search history.

(56) References Cited

U.S. PATENT DOCUMENTS

| | | | |
|---|---|---|---|
| 2010/0093364 A1* | 4/2010 | Ribeiro | H04W 72/082 455/452.2 |
| 2012/0122463 A1* | 5/2012 | Chen | H04W 72/082 455/450 |
| 2012/0243431 A1* | 9/2012 | Chen | H04W 72/0406 370/252 |
| 2013/0252621 A1* | 9/2013 | Dimou | H04W 72/082 455/450 |

OTHER PUBLICATIONS

Yang, et al., "A Shared Relay-Assisted Interference Avoidance for D2D Communications in Cellular Networks," 2012, 4 pages.
Yang, et al., "ICI Management Scheme Using Multi-cell Shared Relay Node in 3GPP LTE-Advanced Networks," SK Telecommunications Review, 4G System, Sepcial Issue, vol. 21 No. 5, Oct. 2011, pp. 799-818.
PCT International Application No. PCT/KR2012/011817, Written Opinion of the International Searching Authority dated Apr. 22, 2013, 1 page.

* cited by examiner

METHOD AND APPARATUS FOR CONTROLLING INTERFERENCE BETWEEN CELLULAR COMMUNICATION AND D2D COMMUNICATION

CROSS-REFERENCE TO RELATED APPLICATIONS

This application is the National Stage filing under 35 U.S.C. 371 of International Application No. PCT/KR2012/011817, filed on Dec. 28, 2012, which claims the benefit of U.S. Provisional Application Ser. No. 61/666,941, filed on Jul. 2, 2012, the contents of which are hereby incorporated by reference herein in their entirety.

BACKGROUND OF THE INVENTION

Field of the Invention

The present invention relates to wireless communications and, more particularly, to a method and apparatus for controlling interference between a cellular communication and a D2D communication.

Related Art

The device-to-device (D2D) communication that uses the same spectrum as the existing cellular communication has many advantages. In the aspect of a user equipment (UE), high throughput, low delay and saving power consumption and the like can be expected. In addition, if the cellular communication and the D2D communication are performed at the same time, the frequency reuse gain may be increased. In comparison with the gain that can be obtained by using uplink/downlink through a base station in the cellular communication, the gain obtainable by using a single link in the D2D communication is referred to as the 'hop gain'. The D2D communication expands the coverage of the existing cellular network, and also may provide a new type of peer to peer (P2P).

However, in spite of the advantages above, the D2D communication that uses the same spectrum as the existing cellular communication has a few problems. In particular, in case that the D2D communication is performed in a macro cell based on 3rd generation partnership project (3GPP) long term evolution (LTE)-Advanced using the orthogonal frequency division multiple access (OFDMA), considerable size of interference may occur between the macro cell and D2D communication. Such interference also causes unexpected damage to a macro UE such as communication disconnection.

Accordingly, a method and an apparatus for controlling the interference between the cellular communication and the device-to-device (D2D) communication are needed.

SUMMARY OF THE INVENTION

The technical object of the present invention is to provide a method for controlling interference between the cellular communication and the device-to-device (D2D) communication by using a shared relay node (SRN) and an apparatus using the same.

In an aspect, a method for controlling interference between a cellular communication and a device-to-device (D2D) communication is provided. The method includes overhearing a downlink control channel transmitted from a cellular base station to a cellular user equipment, determining an interference candidate resource which is an object of the interference control based on the downlink control channel, and transmitting an interference control message to a D2D user equipment that uses the interference candidate resource.

The method may further include determining an interference candidate user equipment which is the object of the interference control based on a signal power transmitted from the cellular user equipment.

The interference control message may be generated such that maximum power is allocated to the interference candidate resource.

In another aspect, a method for controlling interference between a cellular communication and a device-to-device (D2D) communication is provided. The method includes acquiring information of an interference candidate resource which is an object of the interference control by performing spectrum sensing, and transmitting an interference control message that includes information of the interference candidate resource to a cellular base station.

The interference candidate resource may be a resource used for the D2D communication.

The spectrum sensing may be performed while the D2D communication is performed.

In still another aspect, an apparatus for controlling interference between a cellular communication and a device-to-device (D2D) communication is provided. The apparatus includes a radio frequency (RF) unit configured to transmit and receive a radio signal, and a processor operatively coupled with the RF unit to implement a radio interface protocol. The processor is configured to overhear a downlink control channel transmitted from a cellular base station to a cellular user equipment, determine an interference candidate resource which is an object of the interference control based on the downlink control channel, and transmit an interference control message to a D2D user equipment that uses the interference candidate resource.

In still another aspect, an apparatus for controlling interference between a cellular communication and a device-to-device (D2D) communication is provided. The apparatus includes a radio frequency (RF) unit configured to transmit and receive a radio signal, and a processor operatively coupled with the RF unit to implement a radio interface protocol. The processor is configured to acquire information of an interference candidate resource which is an object of the interference control by performing spectrum sensing, and transmit an interference control message that includes information of the interference candidate resource to a cellular base station.

By controlling the interference between the cellular communication and the D2D communication, the quality of service (QoS) of a user equipment (UE) can be guaranteed.

DESCRIPTION OF EXEMPLARY EMBODIMENTS

A cellular network system includes at least one enhanced Node-B (eNB). The eNB provides services for a specific geographical region (generally, referred to as a cell). A user equipment (UE) may be fixed or mobile, and may be referred to as another terminology, such as a mobile station (MS), a mobile terminal (MT), a user terminal (UT), a subscriber station (SS), a wireless device, etc. The eNB is generally a fixed station that communicates with the UE and may be referred to as another terminology, such as a base station (BS), a base transceiver system (BTS), an access point (AP), etc.

The UE commonly belongs to a cell, and the cell to which the UE belongs is called a serving cell. The eNB that provides communication services for the serving cell is referred to as a serving eNB. In the cellular network system exists another cell which is adjacent to the serving cell. Such another cell adjacent to the serving cell is called a neighbor cell. The eNB that provides communication services for the neighbor cell is called a neighbor eNB. The serving cell and the neighbor cell are relatively determined based on the UE.

In general, downlink means the communication from the eNB to the UE, and uplink means the communication from the UE to the eNB. The transmitter in downlink may be a part of the eNB, and the receiver may be a part of the UE. In uplink, the transmitter may be a part of the UE, and the receiver may be a part of the eNB.

The D2D communication means performing a direct communication among UEs without the aid of eNB. The D2D communication has many advantages, for example, it guarantees high throughput and low delay, and expands the coverage of the existing cellular network. However, in case that the D2D communication uses the same resource as the cellular communication, interference may occur between the cellular communication and the D2D communication.

Hereinafter, the embodiments of the present invention will be described in detail with reference to accompanying drawings.

Figure 1:
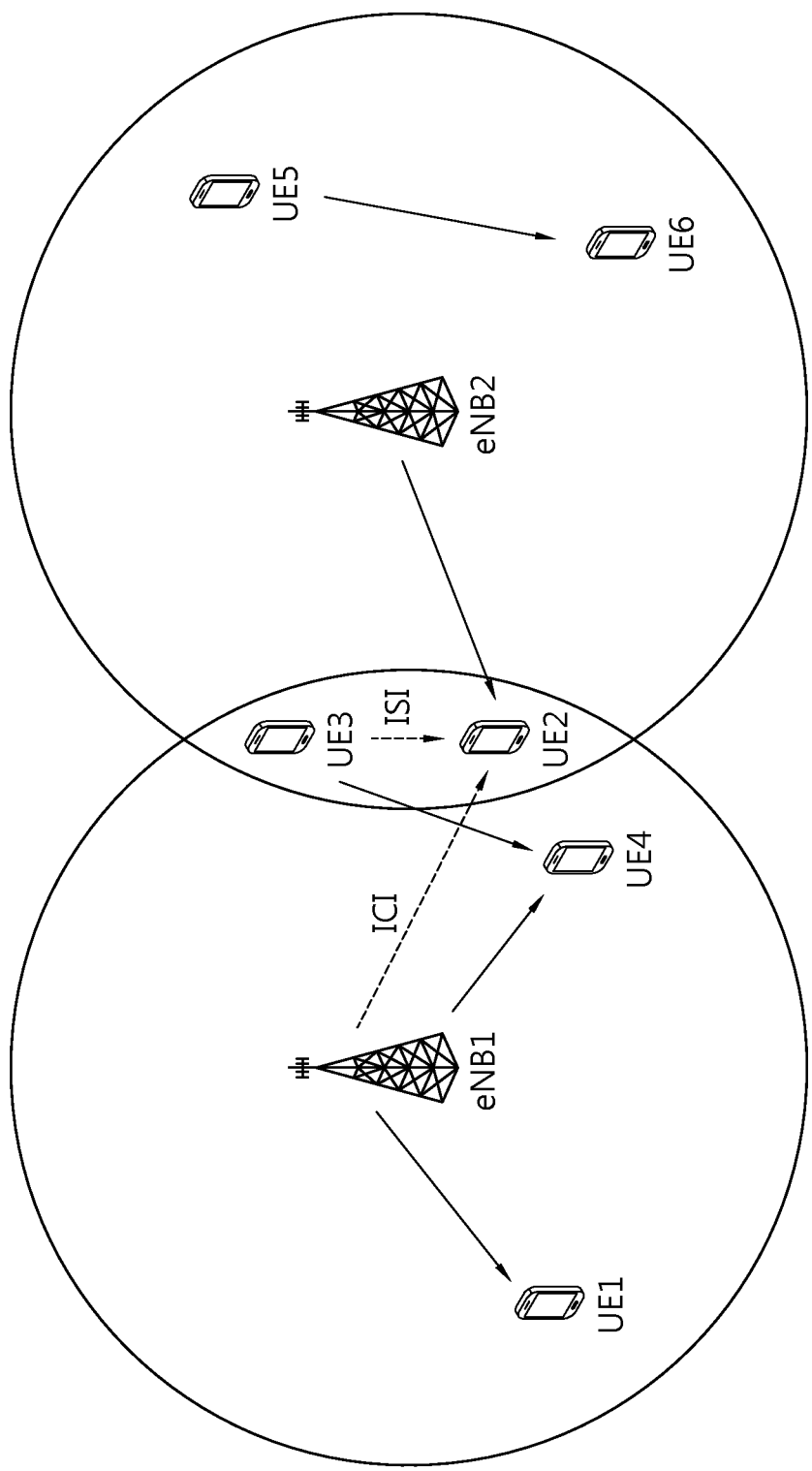
FIG. 1 illustrates an example of interference scenario occurred in downlink.

FIG. 1 illustrates an example of interference scenario occurred in downlink.

Referring to FIG. 1, UE2 may be influenced by the interference occurred from the D2D communication between UE3 and UE4 as well as by the inter-cell interference (ICI) occurred by eNB1. Particularly, since the UE that exists on the boundary of a cell has low signal to interference-plus-noise ratio (SINR), the interference may be fatal.

Figure 2:
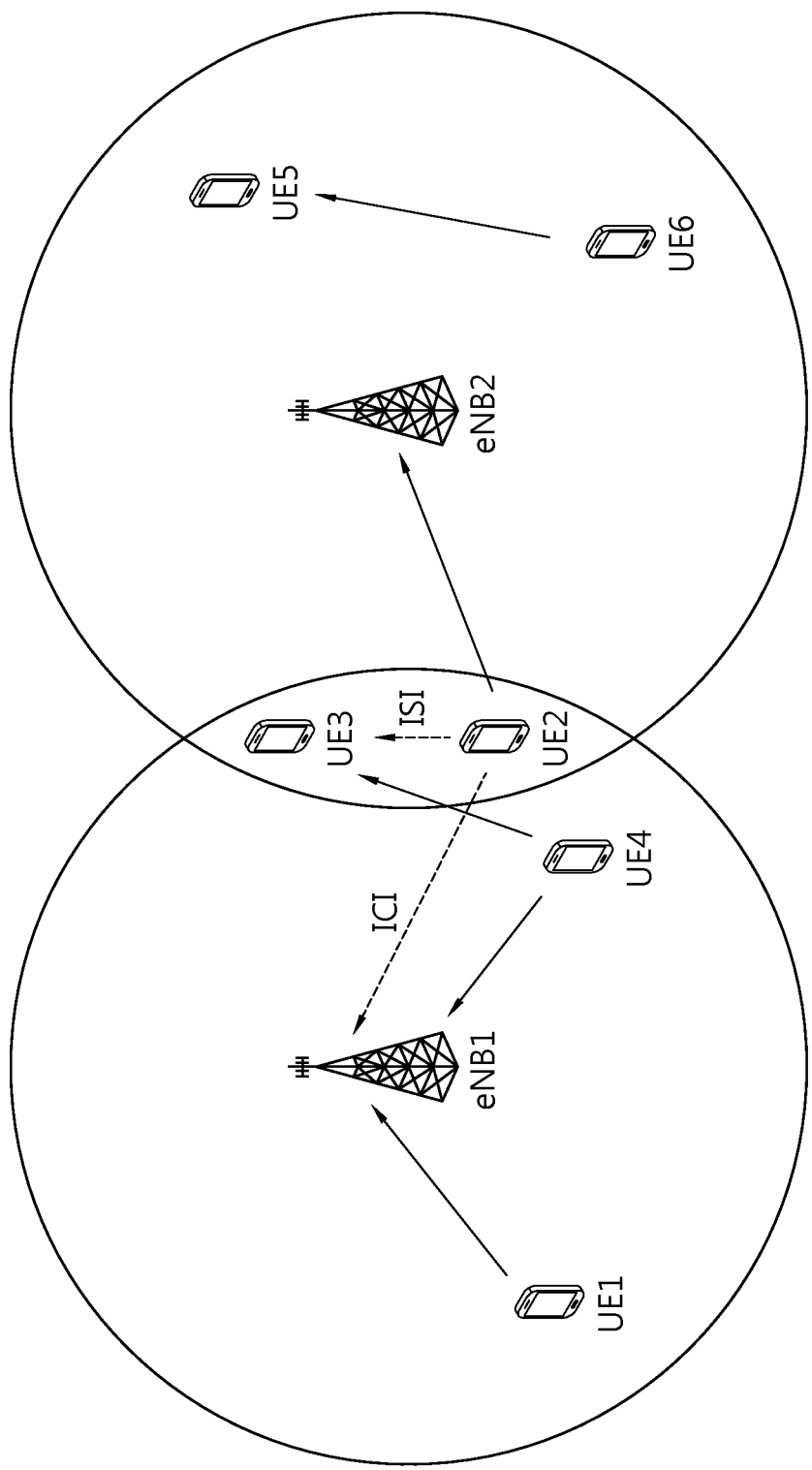
FIG. 2 illustrates an example of the interference scenario occurred in uplink.

FIG. 2 illustrates an example of the interference scenario occurred in uplink.

Referring to FIG. 2, the UE2 that exists on the border of a cell transmits the uplink signal with high power for the nice communication with an eNB. In case that the UE3 and UE4 perform the D2D communication by using the same resource around the UE2, the UE3 is strongly influenced by the uplink signal of the UE2.

Figure 3:
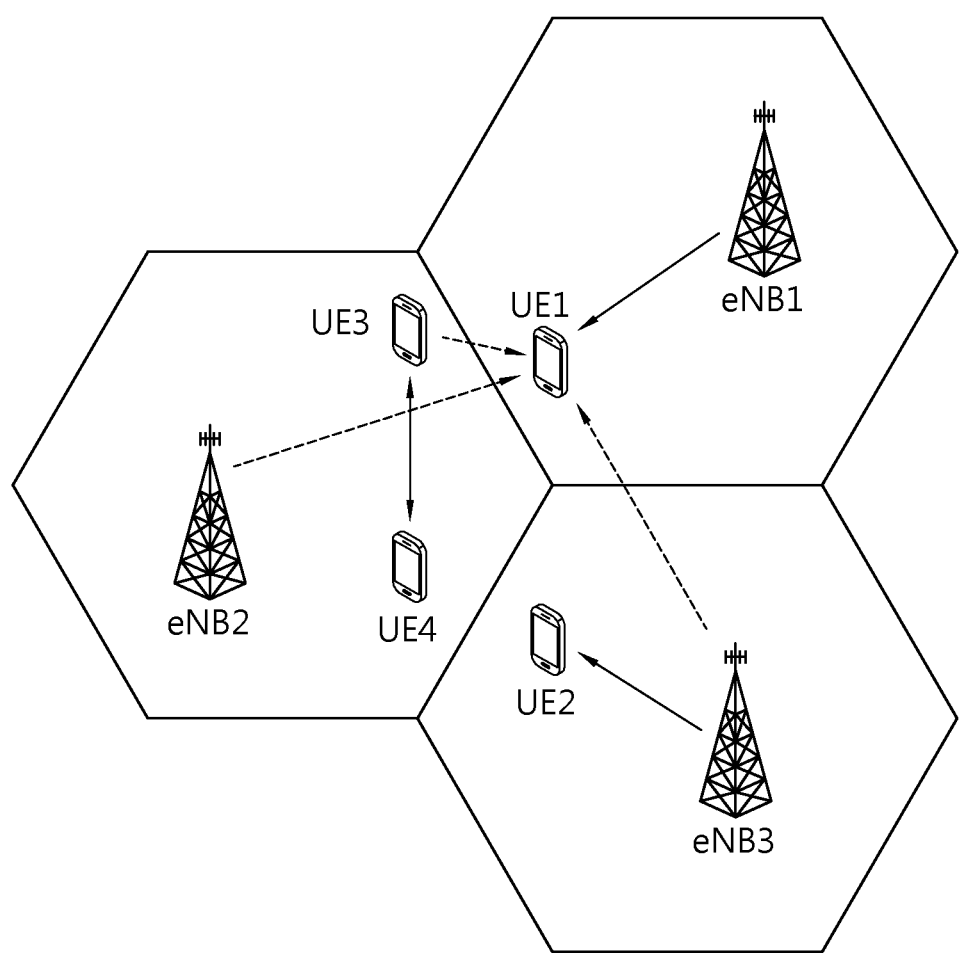
FIG. 3 and FIG. 4 illustrate the influence that the D2D communication has an influence on other cells.
Figure 4:
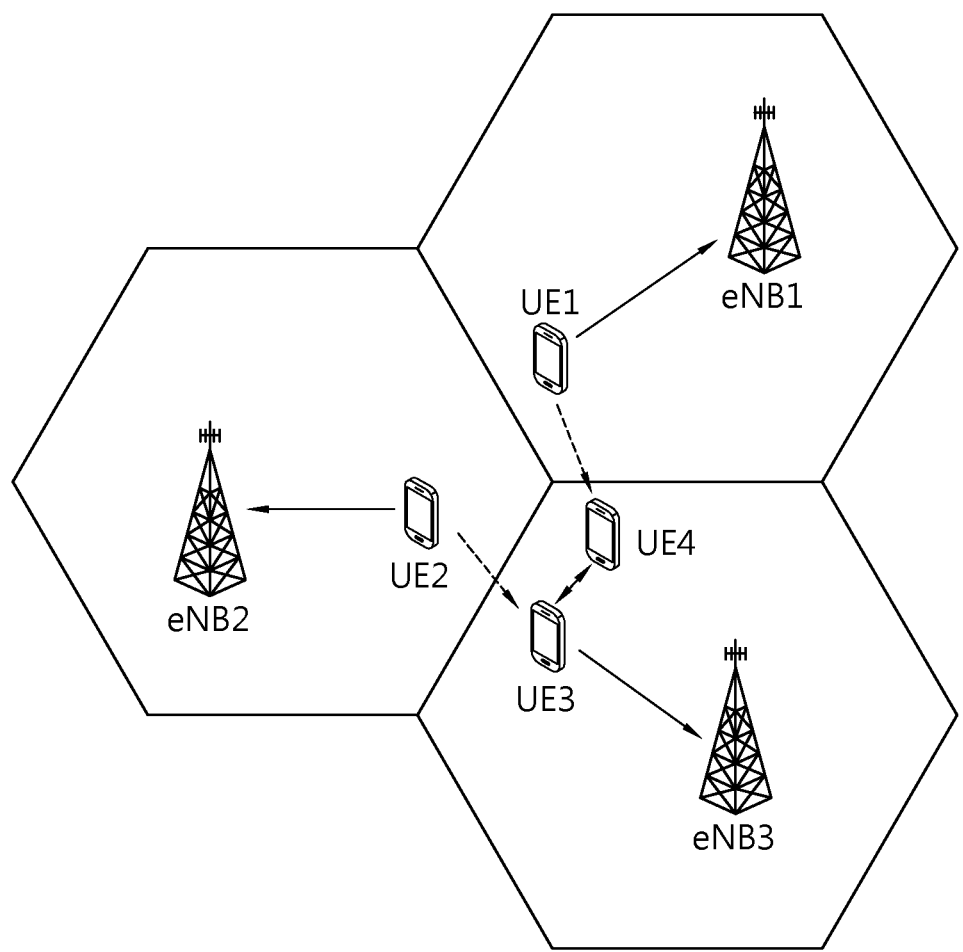

FIG. 3 and FIG. 4 illustrate the influence that the D2D communication has an influence on other cells.

In order to allocate optimal resources, which enables to minimize the interference within a cell, the D2D user equipment may have help from an eNB in the formation process of a link. However, in case that the D2D communication is performed on the border of a cell, the UE of a neighbor cell may be influenced by the D2D communication, or conversely, the D2D communication influenced by the UE of the neighbor cell. That is, the UE3 may interfere in the downlink signal of the UE1 that is located in the neighbor cell (FIG. 3), or may get interference in the uplink signal by the UE2 that is located in an adjacent cell (FIG. 4).

Figure 5:
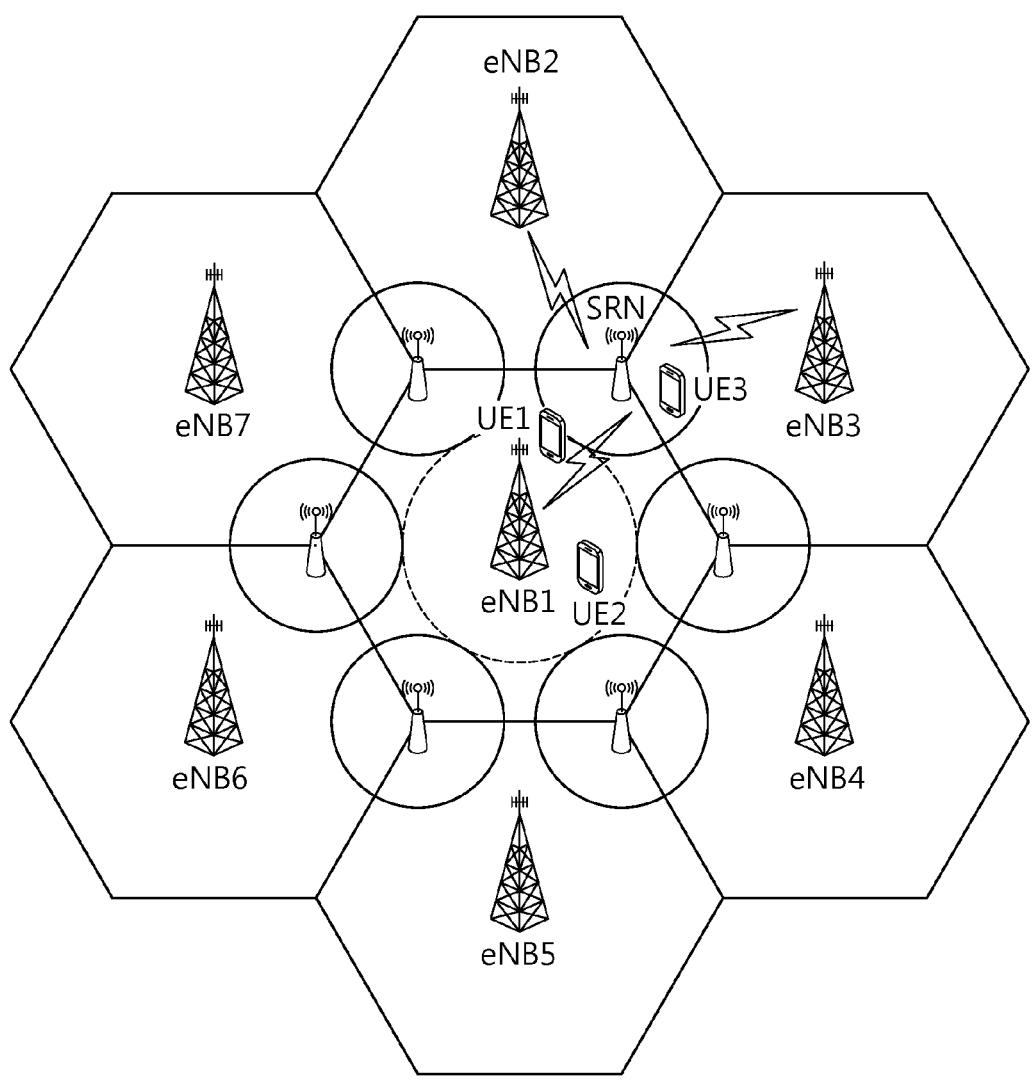
FIG. 5 is an example illustrating a structure of wireless communication system according to the present invention.

FIG. 5 is an example illustrating a structure of wireless communication system according to the present invention.

Referring to FIG. 5, a cellular network where 3 eNBs share one shared relay node (SRN) is formed. That is, the SRN is placed on the center of three cells and controls the interference by using it. In this case, the interferences that the SRN controls includes the interference occurred between the cellular communication and the D2D communication as well as the inter cell interference (ICI) occurred on the border of a cell. Additionally, the SRN may play a role of data reply in order to increase the processing ratio of the cell boundary for each cell.

Hereinafter, for the convenience of description, the interference between the cellular communication and the D2D communication is called an inter system interference (ISI). Also, it is assumed that the fractional frequency reuse (FFR) of the cellular network system is 1, and the cellular communication and the D2D communication use the same resource.

Meanwhile, the SRN described in the present invention has a functional similarity with Type 2 (Type II) of 3GPP LTE-Advanced but the followings are additionally required.

1. The SRN does not have another cell identifier (ID). That is, it does not generate a separate cell.

2. The SRN may perform a relay for 3GPP LTE Rel-8 UE. That is, the SRN may transmit the physical downlink shared channel (PDSCH).

3. The UE does not recognize the existence of SRN. That is, the SRN is transparent to the UE.

4. The SRN may transmit the control information such as the physical downlink control channel (PDCCH) and the physical uplink control channel (PUCCH) to an eNB through X2 signaling. Additionally, it may transmit the control information to UE through a dedicated control channel.

5. The SRN may restore the control information such as the PDCCH and the PUCCH.

6. The SRN may use the existing X2 signaling or a newly defined X2 signaling in order to share the control information with an eNB.

7. The SRN may overhear the downlink signal and/or uplink signal between an eNB and a UE. In case of normally decoding the downlink signal and/or uplink signal, the SRN relays the corresponding signal.

8. The SRN may measure the channel quality for the link from a UE to the SRN by overhearing the uplink sounding reference signal (SRS), and change a modulation and coding scheme (MCS) level based on it. In case of a time division duplex (TDD), the application may extend to the link from the SRN to the UE.

9. The SRN may scan the adjacent UE for the ICI control.

The SRN may overhear the uplink SRS from a UE to an eNB, and based on this, determine whether the corresponding UE is contiguous. For example, it may be determined whether the corresponding UE is contiguous based on a predetermined threshold.

The SRN may overhear the D2D signal which is transmitted from a D2D transmission UE to a D2D reception UE, and based on this, determine whether the corresponding UEs are contiguous. For example, it may be determined whether the corresponding UEs are contiguous based on a predetermined threshold.

10. The SRN may share the information of the PDCCH and the PDSCH by overhearing the downlink signal from an eNB to a UE.

11. The SRN may share the information of the PUCCH and the physical uplink shared channel (PUSCH) by overhearing the uplink signal from a UE to an eNB.

12. The SRN may share the information of the channel quality indicator (CQI) by overhearing the clear to send (CTS) of the UE that performs the D2D communication.

13. The SRN may perform the spectrum sensing during the data transmission by the UE that performs the D2D communication.

14. The SRN may perform the ICI control based on the information shared in No. 10 to 13. Here, the ICI control method includes all of the methods using the information shared by 10 to 13.

It is preferable that all of the conditions described above are satisfied, but all of them should not be satisfied. That is, the aforementioned conditions are not prerequisite but may be selectively considered.

In the meantime, to overhear is to open a signal that is not targeted, for instance, it means that the SRN is listening to the signal transmitted from an eNB to a UE. In order to open the signal that is not targeted, a control channel of another UE can be decoded. For this, an identifier (ID) of the corresponding UE, an authority and/or authentication for the corresponding UE may be required.

Figure 6:
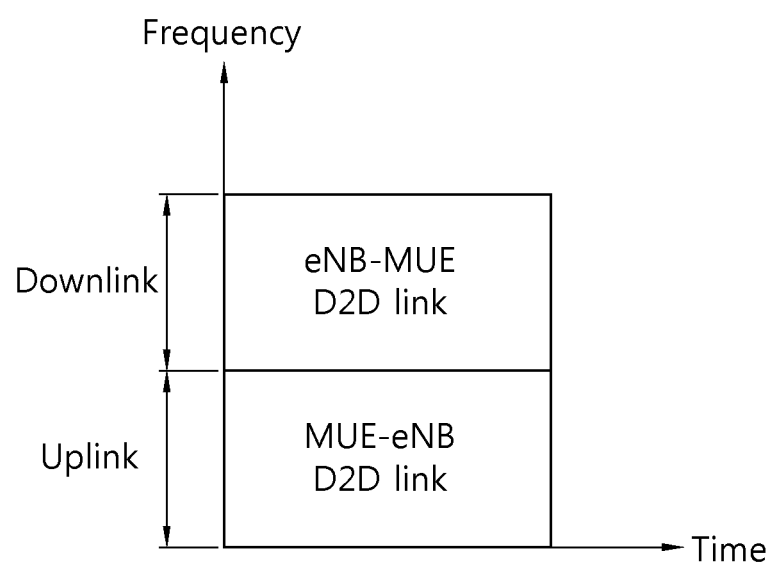
FIG. 6 illustrates an example of resource allocation in the wireless communication system to which the present invention is applied.

FIG. 6 illustrates an example of resource allocation in the wireless communication system to which the present invention is applied. Hereinafter, for the convenience of description, the UE that performs the cellular communication is referred to as a macro UE (MUE), and the UE that performs the D2D communication is referred to as a device to device UE (DUE).

In case of the wireless resource being allocated in the frequency division duplexing (FDD), both downlink and uplink may exist in the same time-domain according to a common FDD, but the both can be distinguished in the frequency-domain.

Meanwhile, in the wireless communication system where the cellular communication and the D2D communication coexist, identical frequency resource may be used in the cellular communication and the D2D communication due to the frequency reuse. Therefore, ISI can be occurred.

Figure 7:
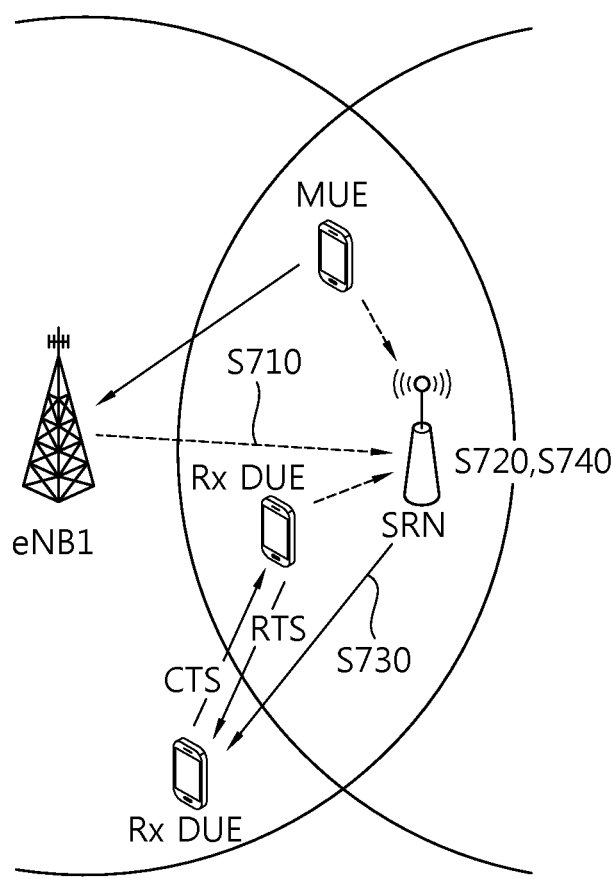
FIG. 7 illustrates an inter system interference (ISI) control method according to an embodiment of the present invention.

FIG. 7 illustrates an inter system interference (ISI) control method according to an embodiment of the present invention.

The SRN overhears the PDCCH transmitted from eNB to MUE (step, S710). The SRN may have an ID of the corresponding MUE to decode the PDCCH, and the decoded PDCCH may be stored and recorded in a buffer.

Meanwhile, the SRN may control the ISI for all MUEs which are located around, but control the ISI for a specific MUE. That is, the SRN may determine the MUE that requires the ISI control among the MUEs which are located around, and control the ISI for the corresponding MUE. For example, the SRN may overhear the uplink signal of the MUE, and based on this, determine whether to perform the ISI control for the corresponding MUE. If it is defined that the MUE requiring the ISI control to be S, and the MUE not requiring the ISI control to be T, the S and T are represented by Equation 1.

In this time, the SRN may determine whether to perform the ISI control for the corresponding MUE by overhearing the uplink signal of MUE, for example, the PUCCH. If it is defined that the MUE requiring the ISI control to be S, and the MUE not requiring the ISI control to be T, the S and T are represented by Equation 1.

$$S=\{MUE|\gamma_{MUE}>\Gamma\}$$

$$T=\{MUE|S^C\} \quad \text{[Equation 1]}$$

Here, $\gamma_{MUE}$ is the power of uplink signal which is overheard by the SRN, and $\Gamma$ is a predetermined threshold value. Referring to Equation 1, in case that the received power of the uplink signal of the MUE is greater than the threshold value, the SRN determine the corresponding MUE to be MUE S that requires the ISI control. The fact that the power of uplink signal is great may mean that the corresponding MUE is located near to the SRN or mean that the channel state between the corresponding MUE and the eNB is not good. Accordingly, the SRN may determine whether to perform the ISI control for the corresponding MUE by overhearing the uplink signal of MUE.

Meanwhile, the SRN may acquire the information of downlink and uplink resources which are allocated to the MUE through decoding the PDCCH. The SRN performs a series of processes for controlling the ISI based on the information acquired (step, S720).

For example, the SRN may determine the resource in which the ISI may occur based on the information acquired. Since it is general that the session of D2D communication is started regardless of the uplink/downlink of the cellular network, the ISI is changed according to the state of link regardless of the direction of link of the cellular network. Accordingly, the SRN may determine the uplink/downlink resource of the MUE that requires the ISI control to be the interference candidate resource in which the ISI may occur.

When the eNB transmits the D2D session request message to the D2D transmission UE, that is, the Tx DUE for the D2D communication, the SRN overhears the message.

Later, when the request to send (RTS) message that the Tx DUE transmits to the D2D reception UE, that is, the Rx DUE is overheard, the SRN transmits the message for controlling the ISI to the Rx DUE (step, S730). The message may include the current channel state, the information of whether the collision occurs in the allocated resource, the opposition/prohibition command for a specific resource, and etc. and be generated such that the maximum power is allocated to the interference candidate resource. The message may be transmitted by the broadcast way.

If the Rx DUE that receives the RTS message transmits the clear to send (CTS) message, the SRN overhears the message. The Tx DUE allocates the resource for the D2D communication based on the CTS message and the CQI information. Finally, the Tx DUE performs the D2D communication with the Rx DUE through the resource allocated.

Meanwhile, the SRN may perform the spectrum sensing while the D2D communication is performed, and may add the resource used for the D2D communication to the interference candidate resource (step, S740).

Figure 8:
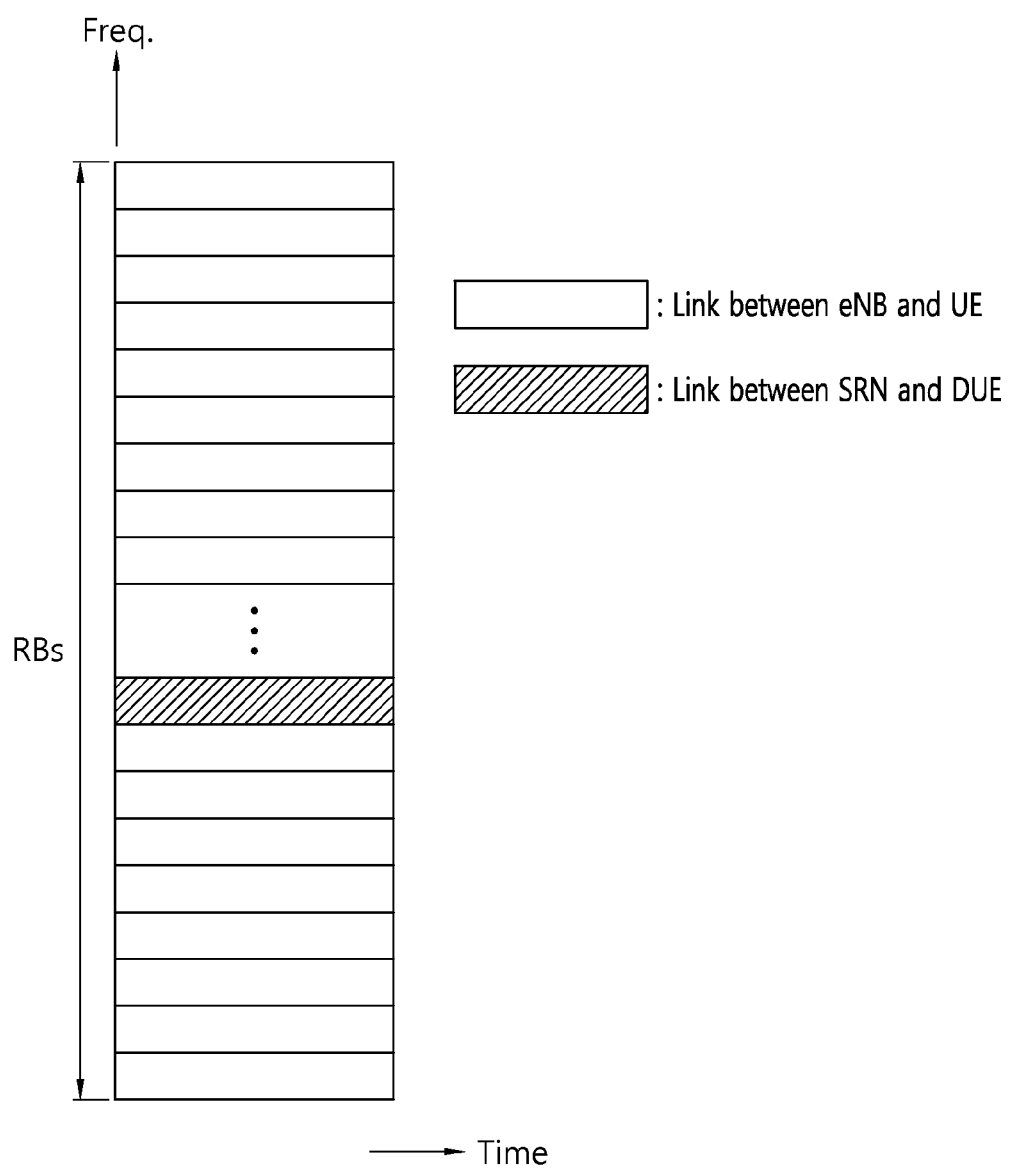
FIG. 8 illustrates the dynamic resource allocation in the wireless communication system according to an embodiment of the present invention.

FIG. 8 illustrates the dynamic resource allocation in the wireless communication system according to an embodiment of the present invention.

If the partial frequency reuse is 1, an eNB may dynamically allocate all resource blocks (RBs) using various scheduling method such as the proportional fairness (PF) and the Max carrier to interference and noise ratio (CINR).

Also, if the link between a SRN and the HeNB is allocated as the dedicated channel, the resource block may not be overlapped as shown in FIG. 8.

Figure 9:
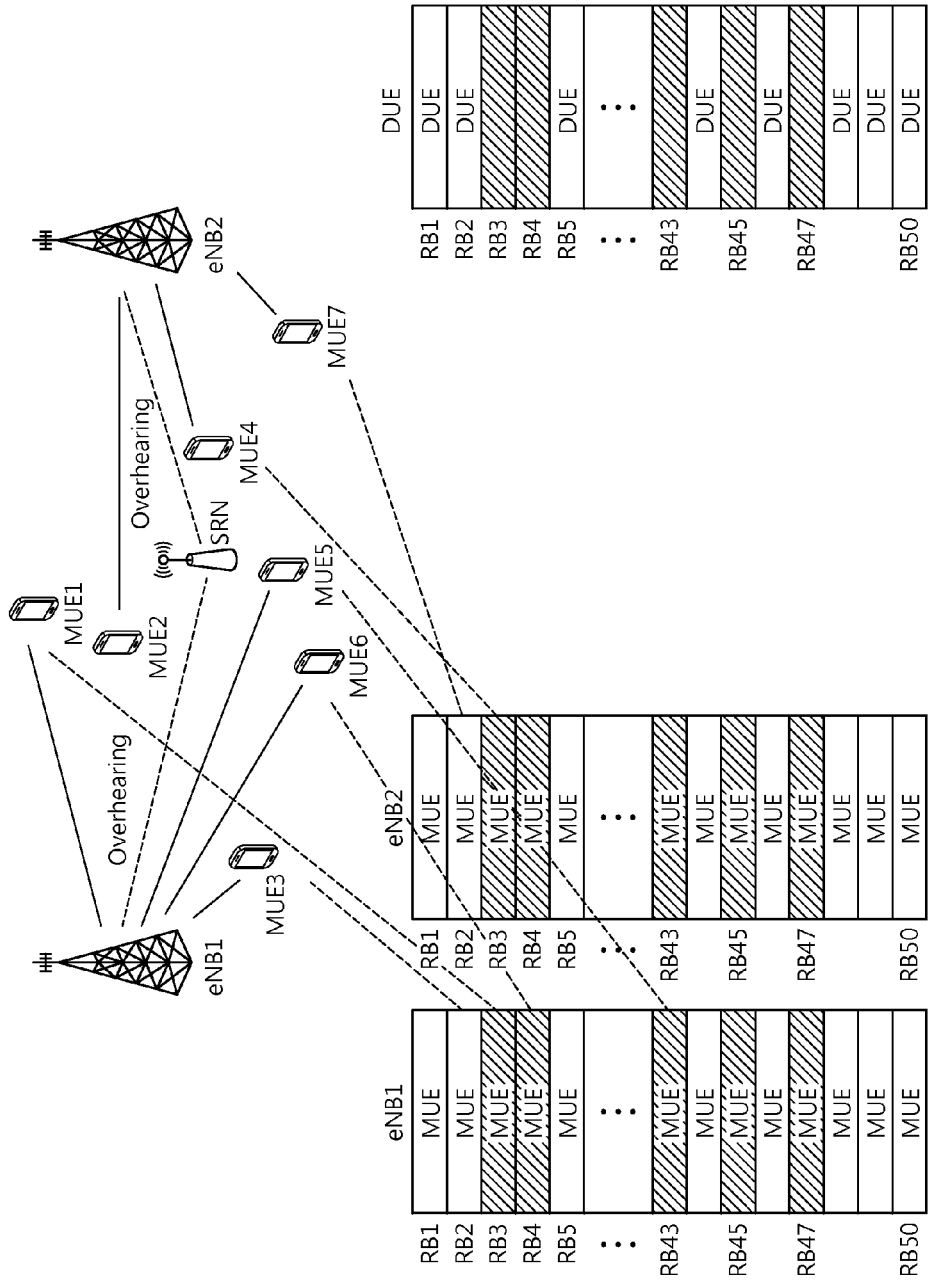
FIG. 9 illustrates an example of resource allocation according to the embodiment of FIG. 7.

FIG. 9 illustrates an example of resource allocation according to the embodiment of FIG. 7.

As described above, the SRN overhears the PDCCH which is transmitted from the macro eNB to the MUE, and determines the interference candidate resource. In addition, the SRN generates the interference candidate resource such that the maximum power is allocated to the interference candidate resource. Later, if the Tx DUE transmits the RTS message to the Rx DUE, the SRN may transmit the interference control message to the Rx DUE, and command to prohibit the use of the corresponding resource.

Referring to FIG. 9, the ISI may occur at R={RB3, RB4, RB43, RB45, RB47}. Accordingly, the SRN determine the R={RB3, RB4, RB43, RB45, RB47} to be the interference candidate resource, and generates the interference control message such that the maximum power is allocated to the resource. The Rx DUE receives the interference control message from the SRN, and performs dynamic resource allocation by using the other resource except the interference candidate resource. That is, in order to protect the cellular communication, the Rx DUE does not use the resource used for the cellular communication.

Figure 10:
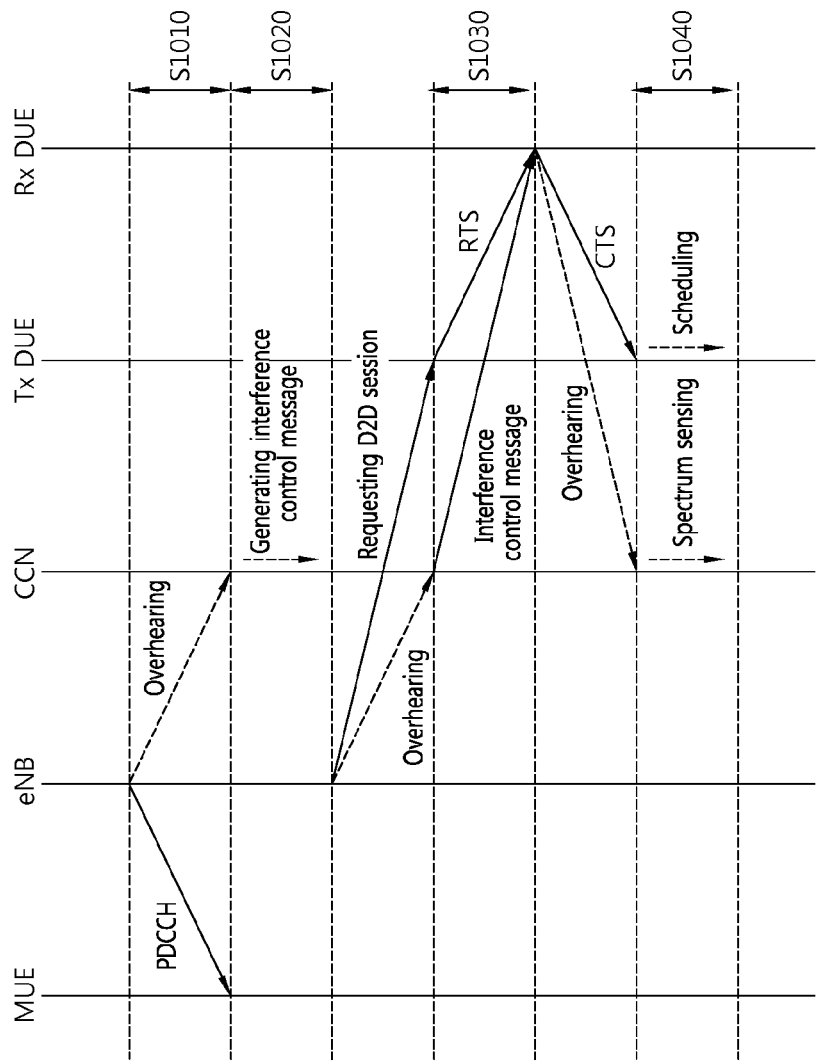
FIG. 10 is an example illustrating a flow of the signal for each entity in the embodiment of FIG. 7.

FIG. 10 is an example illustrating a flow of the signal for each entity in the embodiment of FIG. 7.

In briefly describing FIG. 10, the SRN overhears the PDCCH transmitted from an eNB to the MUE (step, S1010).

The SRN acquires the information of the resource allocated to the MUE by decoding the PDCCH, and generates the interference control message based on the information acquired (step, S1020). The interference control message may include the current channel state, the information of whether the collision occurs in the allocated resource, the opposition/prohibition command for a specific resource, the information of the resource in which the ISI may occur, and so on.

The SRN overhears the D2D session request message which is transmitted from the eNB to a Tx DUE.

When the Tx DUE transmits the RTS message to the Rx DUE, the SRN transmits the interference control message to the Rx DUE (step, S1030).

The SRN overhears the CTS message which is transmitted from the Rx DUE to the Tx DUE.

The SRN performs the spectrum sensing while the D2D communication is performed (step, S1040).

Steps S1010 to S1040 are recursively performed, and the detailed description will be omitted since it is the same as the description with reference to FIG. 7.

Figure 11:
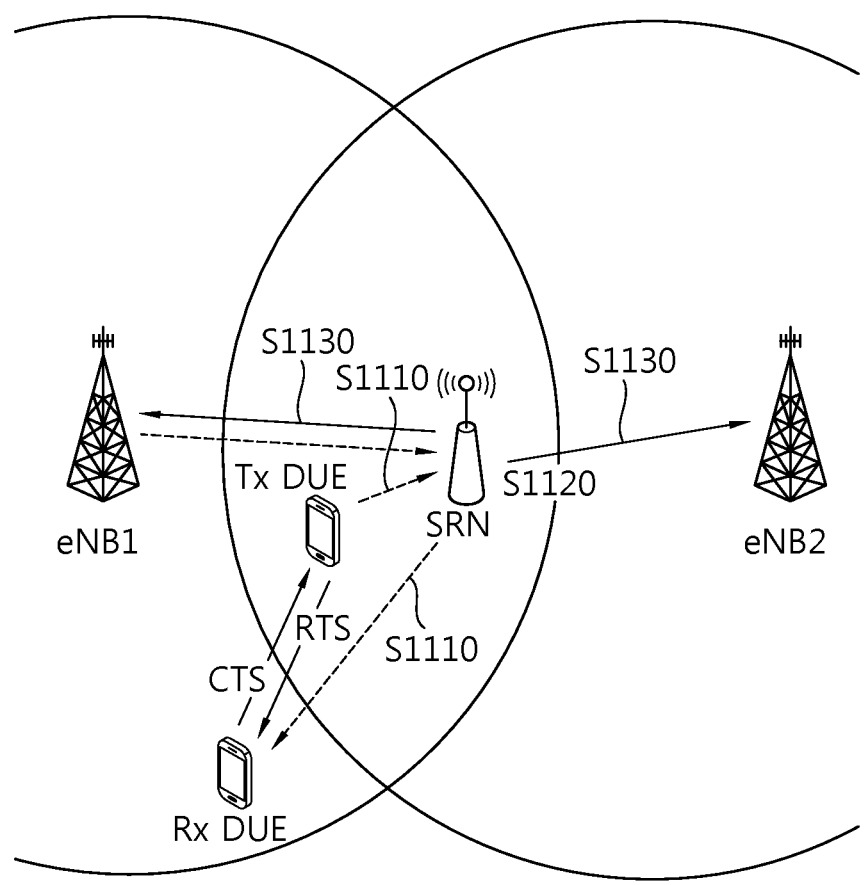
FIG. 11 illustrates a method of controlling the ISI according to an embodiment of the present invention.

FIG. 11 illustrates a method of controlling the ISI according to an embodiment of the present invention.

When an eNB transmits the D2D session request message to the Tx DUE for the D2D communication, the SRN overhears the message. Later, the SRN overhears the RTS message transmitted from the Tx DUE to a Rx DUE and the CTS message transmitted from the Rx DUE to the Tx DUE (step, S1110). In this time, the SRN may acquire the CQI of the Tx DUE to Rx DUE link.

Meanwhile, the SRN may control the ISI for all D2D links which are located around, but control the ISI for a specific link. That is, the SRN may determine the link that requires the ISI control to be the interference control object link among the D2D links which are located around, and control the ISI for the corresponding link. For example, the SRN may determine whether to perform the ISI control for the corresponding link based on the signal power transmitted from the Tx DUE and the Rx DUE. If it is defined that the link requiring the ISI control is D, the D can be represented by Equation 2.

$$D=\{DUE|Max(\gamma_{Tx\_DUE}, \gamma_{Rx\_DUE})\Gamma\}$$ [Equation 2]

Here, Max (a, b) represents the greater value between a and b, and $\gamma_{Tx\_DUE}$ represents the power of signal (i.e., the RTS) of the Tx DUE which is overheard by the SRN, and $\gamma_{Rx\_DUE}$ represents the power of signal (i.e., the CTS) of the Rx DUE which is overheard by the SRN.

The SRN performs the spectrum sensing while the D2D communication is performed (step, S1120). It is realistically hard to perform the spectrum sensing for all slots. Accordingly, the SRN may perform the spectrum sensing only for the slot where the D2D communication is performed.

Meanwhile, the SRN may acquire the information of the resource that the Tx DUE and the Rx DUE use in the D2D communication through the spectrum sensing. Since it is possible that the ISI may occur for the resource used for the D2D communication, it is preferable not to permit the spectrum access to the resource. Accordingly, the SRN generates the interference control message that includes the information of resource used for the D2D communication and transmits it to eNB (step, S1130).

Later, in case of allocating the resource, the eNB determines the resource to be allocated to the MUE among the resource in which the spectrum access is permitted, that is, the resource which is not used for the D2D communication.

Figure 12:
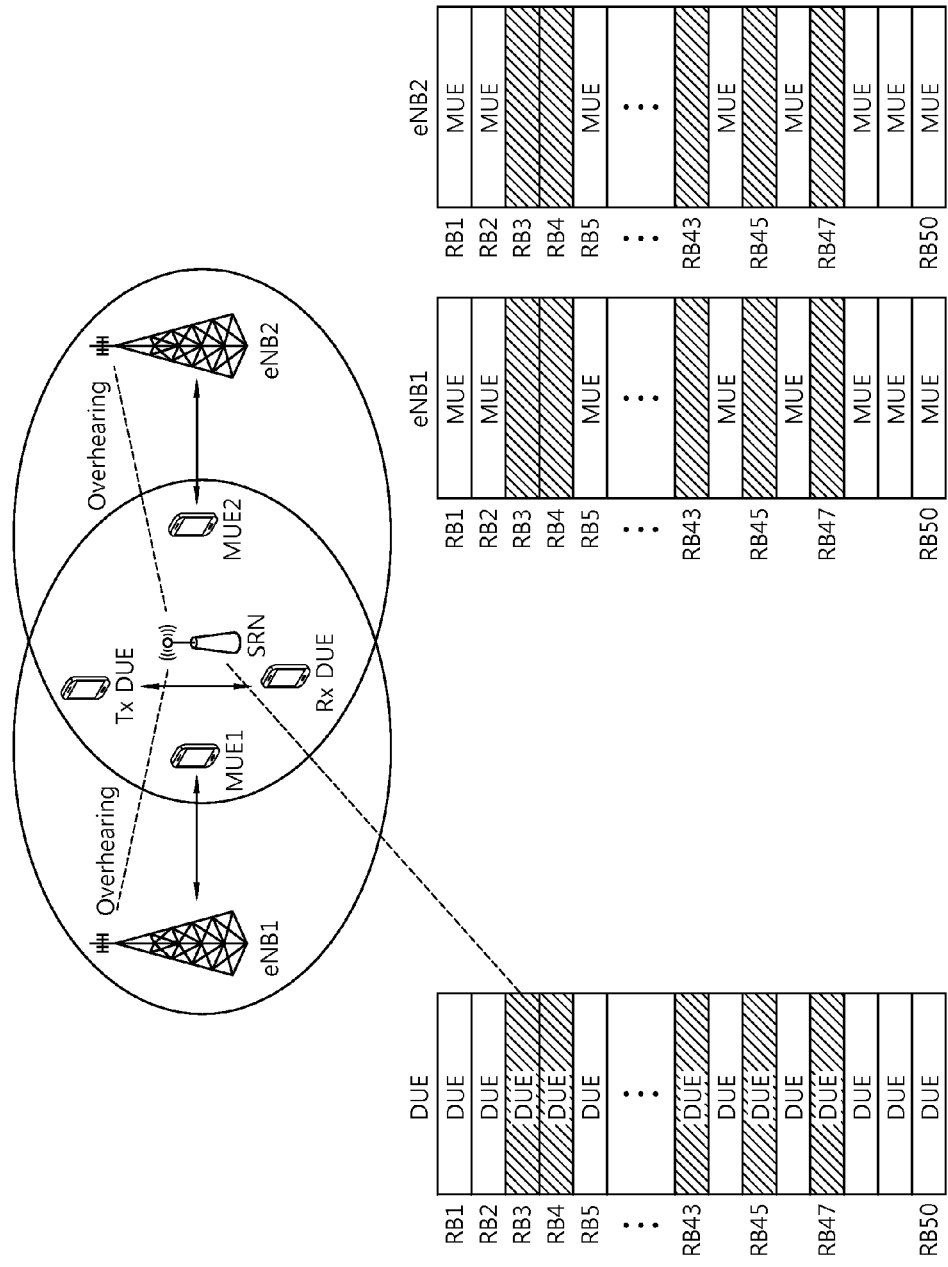
FIG. 12 illustrates an example of resource allocation according to the embodiment of FIG. 11.

FIG. 12 illustrates an example of resource allocation according to the embodiment of FIG. 11.

As described above, the SRN acquires the information of the resource used for the D2D communication through the spectrum sensing and forwards it to the eNB, and the eNB determines the resource allocated to the MUE among the resources except the resource used for the D2D communication.

Referring to FIG. 12, R={RB3, RB4, RB43, RB45, RB47} is used for the D2D communication. When the eNB allocates R={RB3, RB4, RB43, RB45, RB47} to the MUE, the SRN notifies that the ISI may occur to the eNB, and the eNB determines the resource to be allocated to the MUE among the resources except R. That is, in order to protect the D2D communication, the resource used for the D2D communication is not to be used.

Figure 13:
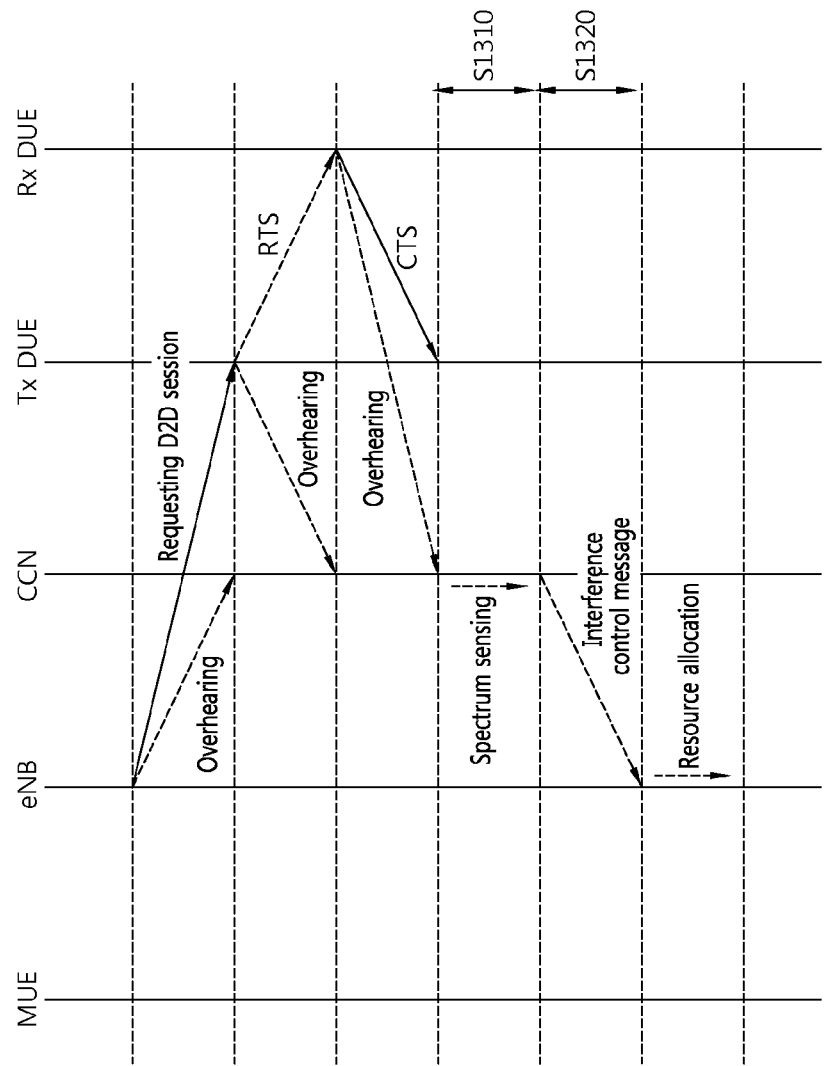
FIG. 13 is an example illustrating a flow of the signal for each entity in the embodiment of FIG. 11.

FIG. 13 is an example illustrating a flow of the signal for each entity in the embodiment of FIG. 11.

In briefly describing FIG. 13, the SRN overhears the D2D session request transmitted from the eNB to the Tx Due, the RTS transmitted from the Tx DUE to the Rx DUE and the CTS transmitted from the Rx DUE to the Tx DUE.

The SRN acquires the information of the resource used for the D2D communication through the spectrum sensing (step, 1310).

The SRN transmits the interference control message that includes the information of the resource used for the D2D communication to the eNB (step, S1320). Based on this, the eNB determines the resource to be allocated to the MUE among the resources which are not used for the D2D communication.

The processes described above may be recursively performed, and the detailed description will be omitted since it is the same as the description with reference to FIG. 11.

Meanwhile, the embodiment of FIG. 7 and the embodiment of FIG. 11 are separately described according to the entity to which the interference control message is transmitted, but the embodiment of FIG. 7 and the embodiment of FIG. 11 can be implemented with being merged.

Figure 14:
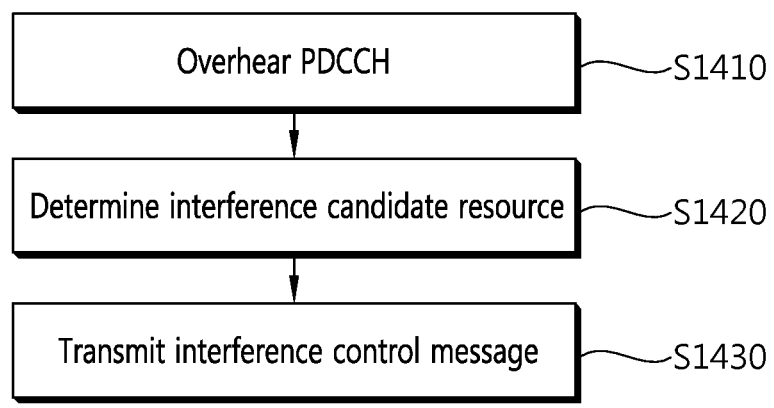
FIG. 14 is a flowchart illustrating a method for controlling interference between the cellular communication and the D2D communication according to an embodiment of the present invention.

FIG. 14 is a flowchart illustrating a method for controlling interference between the cellular communication and the D2D communication according to an embodiment of the present invention.

A SRN overhears the downlink control channel which is transmitted from an eNB, i.e., a cellular base station to a MUE, i.e., a cellular user equipment (step, S1410).

The SRN determines the interference candidate resource which is an object of the interference control (step, S1420). That is, the SRN may acquire the information of the resource allocated to the cellular user equipment by decoding the downlink control channel, and determine the interference candidate resource based on the information acquired.

Meanwhile, in case of determining the interference candidate user equipment which is an object of interference control based on the signal power transmitted from the cellular user equipment, the interference candidate resource may be the resource allocated to the interference candidate user equipment.

The SRN transmits the interference control message to the D2D user equipment that uses the interference candidate resource (step, S1430). The interference control message may include the current channel state, the information of whether the collision occurs in the allocated resource, the opposition/prohibition command for a specific resource, and etc. and be generated such that the maximum power is allocated to the interference candidate resource.

Figure 15:
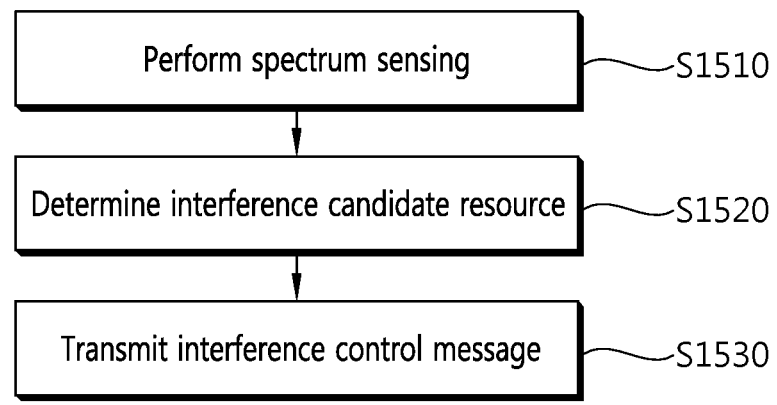
FIG. 15 is a flowchart illustrating a method for controlling interference between the cellular communication and the D2D communication according to another embodiment of the present invention.

FIG. 15 is a flowchart illustrating a method for controlling interference between the cellular communication and the D2D communication according to another embodiment of the present invention.

A SRN acquires the information of the interference candidate resource which is an object of the interference control by performing the spectrum sensing (steps, S1510 and 1520). The interference candidate resource may mean the resource used for the D2D communication. Also, the SRN may perform the spectrum sensing only for the D2D communication being performed, and for this, the SRN may overhear the D2D session request transmitted from an eNB to a Tx DUE, the RTS transmitted from the Tx DUE to a Rx DUE and the CTS transmitted from the Rx DUE to the Tx DUE.

The SRN transmits the interference control message that includes the information of the interference candidate resource to the eNB, i.e., a cellular base station (step, S1530). The interference control message may include the current channel state, the information of whether the collision occurs in the allocated resource, the opposition/prohibition command for a specific resource, and etc.

Figure 16:
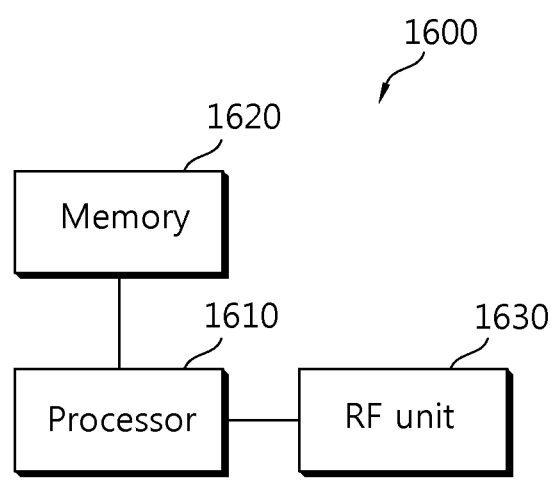
FIG. 16 is a block diagram illustrating the shared relay node (SRN) in which an embodiment of the present invention can be implemented.

FIG. 16 is a block diagram illustrating the shared relay node (SRN) in which an embodiment of the present invention can be implemented.

The SRN 1600 includes a processor 1610, a memory 1620 and a RF unit 1630. The memory 1620 stores various data for driving the processor 1610 with being connected to the processor 1610. The RF unit 1630 transmits and/or receives the radio signal with being connected to the processor 1610.

The processor 1610 implements the suggested function, process and/or method. In the embodiments of FIG. 7 to FIG. 15, the operation of SRN may be implemented by the processor 1610.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for controlling interference between a cellular communication and a device-to-device (D2D) communication, the method performed by a relay node comprising:
    overhearing, by the relay node, a downlink control channel transmitted from a cellular base station to a cellular user equipment (UE);
    determining, by the relay node, a downlink or uplink resource, allocated by the cellular base station for the cellular UE based on the downlink control channel; and
    transmitting, by the relay node, a message for controlling a D2D UE's usage of the determined downlink or uplink resource thereby adjusting an interference to the D2D UE,
    wherein the overhearing the downlink control channel includes:
    decoding the downlink control channel using an identifier of the cellular UE stored in the relay node;
    storing the decoded downlink control channel in a buffer; and
    relaying the stored downlink control channel to the cellular UE.

2. The method of claim 1, further comprising:
    determining, by the relay node, the D2D UE which is the object of the interference control based on a signal power transmitted from the cellular UE,
    wherein the determined downlink or uplink resource is a resource allocated to the D2D UE.

3. The method of claim 2, wherein the D2D UE is a user equipment of which a signal power transmitted from the D2D UE is greater than a predetermined threshold value.

4. The method of claim 1, wherein the message instructs the D2D UE either to not use the determined downlink or uplink resource or to allocate a maximum power on the determined downlink or uplink resource.

5. A method for controlling interference between a cellular communication and a device-to-device (D2D) communication, the method performed by a relay node comprising:
overhearing, by the relay node, at least one of a D2D session request, a Request to Send (RTS), or a Clear to Send (CTS) transmitted from a first D2D user equipment (UE) to a second D2D UE;
acquiring, by the relay node, a message information of a downlink or uplink resource, allocated by the first D2D UE for the second D2D UE by performing spectrum sensing of the overheard signal; and
transmitting, by the relay node, a message that includes the information of the downlink or uplink resource to a cellular base station,
wherein the overhearing the at least one of the D2D session request, the RTS, or the CTS includes:
decoding the at least one of the D2D session request, the RTS, or the CTS using an identifier of the second D2D UE stored in the relay node;
storing the at least one of the D2D session request, the RTS, or the CTS in a buffer; and
relaying the at least one of the D2D session request, the RTS, or the CTS to the second D2D UE.

6. The method of claim 5, wherein the downlink or uplink resource is a resource used for the D2D communication.

7. The method of claim 5, wherein the spectrum sensing is performed while the D2D communication is performed.

8. An apparatus for controlling interference between a cellular communication and a device-to-device (D2D) communication, the apparatus comprising:
a radio frequency (RF) unit configured to transmit and receive a radio signal;
a memory configured to store an identifier of a cellular user equipment (UE); and
a processor operatively coupled with the RF unit to implement a radio interface protocol and configured to:
overhear a downlink control channel transmitted from a cellular base station to a cellular UE;
determine a downlink or uplink resource, allocated by the cellular base station for the cellular UE based on the downlink control channel; and
transmit a message for controlling a D2D UE's usage of the determined downlink or uplink resource thereby adjusting an interference to the D2D UE,
wherein the overhearing the downlink control channel includes:
decode the downlink control channel using the identifier of the cellular UE stored in the memory;
store the decoded downlink control channel in the memory; and
relay the stored downlink control channel to the cellular UE.

9. The apparatus of claim 8, wherein the message instructs the D2D UE either to not use the determined downlink or uplink resource or to allocate a maximum power on the determined downlink or uplink resource.

10. An apparatus for controlling interference between a cellular communication and a device-to-device (D2D) communication, the apparatus comprising:
a radio frequency (RF) unit configured to transmit and receive a radio signal;
a memory configured to store an identifier of a second D2D user equipment (UE); and
a processor operatively coupled with the RF unit to implement a radio interface protocol and configured to:
overhear at least one of a D2D session request, a Request to Send (RTS), or a Clear to Send (CTS), transmitted from a first D2D UE to the second D2D UE;
acquire information of a downlink or uplink resource, allocated by the first D2D UE for the second D2D UE which is an object of the interference control by performing spectrum sensing of the overheard signal; and
transmit an a message that includes the information of the downlink or uplink resource to a cellular base station,
wherein the overhearing the at least one of the D2D session request, the RTS, or the CTS includes:
decode the at least one of the D2D session request, the RTS, or the CTS using an identifier of the second D2D UE stored in the memory;
store the decoded downlink control channel in the memory; and
relay the at least one of the D2D session request, the RTS, or the CTS to the second D2D UE.

11. The apparatus of claim 10, wherein the spectrum sensing is performed while the D2D communication is performed.

* * * * *